July 5, 1938. E. L. GEGERFELDT 2,122,836
SELF ANGLING APPARATUS FOR THE CATCH OF FISH
Filed March 16, 1937
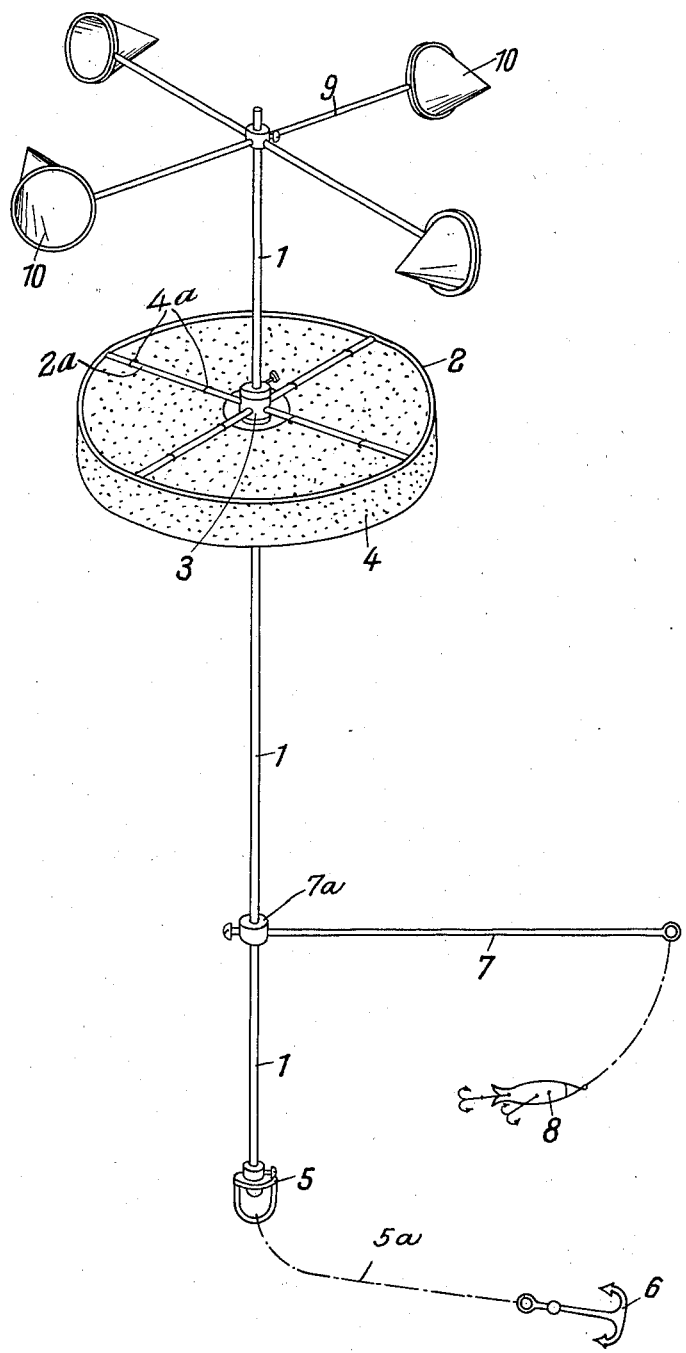
Inventor:
Erik Linus Gegerfeldt Patented July 5, 1938

2,122,836

UNITED STATES PATENT OFFICE 2,122,836

SELF-ANGLING APPARATUS FOR THE CATCH OF FISH

Erik Linus Gegerfeldt, Floby, Sweden

Application March 16, 1937, Serial No. 131,204
In Sweden February 18, 1935

1 Claim. (Cl. 43—4)

The present invention relates to a self-angling apparatus for the catch of fish. The apparatus is particularly intended for sport-fishing and household-fishing and may be used instead of such fishing-tackles, at which it is necessary to keep the angle or spoon-bait in movement.

As motive power for the apparatus either the wind, flowing water or current, according to the circumstances the most suitable, may be used.

In the accompanying drawing an embodiment of the invention is illustrated. The apparatus, which is shown in perspective view, consists in a rotatable, vertical rod 1 and a ring-shaped stand 2 with radially arranged rods 2ª, which at the centre of the stand are secured to a housing 3 on the vertical rod. 4 designates a ring-shaped cork plate secured to the radial rods which keeps the apparatus floating in the water and which is secured to the radial rods 2ª by means of wire or the like 4ª. 5 designates a swivel or the like, which is turnably fixed to the lower end of the vertical rod 1, and to which an anchor device 6 of suitable form is fixed by means of a rope or the like 5ª. 7 designates a catch arm, which projects from a clamp 7ª adjustably arranged on the rod 1 by means of a set screw. At the free end of the catch-arm, a spoon-bait 8 is arranged. 9 and 10 designate motive means such as a wind motor.

The apparatus is used in the following manner:

It is put into the water, and the cork plate 4 keeps it afloat, so that the wings 10 lie over the water surface. The anchor device 6 now forms the bottom anchor of the apparatus. When the wind blows, the motor 9, 10 runs, so that the rod 1 rotates and together with the rod the catch-arm 7, fixed to the same. Upon the movement of the catch-arm 7, the spoon-bait is moved around the rod 1. Thus, the apparatus operates perfectly automatically, and it is not necessary to be watching the same.

The apparatus is intended to almost completely be manufactured of metal, and therefore it will not be injured by lying in the water. Thus, it may lie in the fishing-water during the whole year, which is advantageous as regards fish which bite periodically, for instance pike. When fishing for deep sea fish, for instance cod, the rod 1 is constructed so as to be of greater length than it would be when the device is used in shallow water.

Owing to the fact that the catch-arm 7 is flexible and that the apparatus is kept afloat by means of a cork-plate 4, there appears no pull on the apparatus, when a fish bites or plunges in order to be free; the apparatus dives and feathers softly, so that it is not possible for the fish to get free.

When fishing in the winter, the stand 2 may be placed directly upon the edges of a hole made in the ice, instead of being used as a floating member.

I claim:—

A self-angling apparatus for catching fish, consisting of a stand, radial arms for said stand, a cork plate mounted on said radial arms for supporting the stand in the water, a rod turnably arranged in said stand, a swivel secured at the lower end of said rod to receive anchoring means therefor, a clamp adjustably mounted on the rod by means of a set screw, an arm projecting from said clamp to carry a suitable catch device, and motive means secured to arms projecting from said rod for driving same.

ERIK LINUS GEGERFELDT.